United States Patent
Bol et al.

(10) Patent No.: US 8,335,739 B1
(45) Date of Patent: Dec. 18, 2012

(54) SYSTEM AND METHOD FOR PROVIDING CREDIT TO A CUSTOMER BASED ON THE CUSTOMER'S PRELIMINARY USE OF AN ACCOUNT FUNDED BY ANOTHER PARTY

(75) Inventors: Cornelis W. J. Bol, Richmond, VA (US); Soumik Chatterjee, San Diego, CA (US)

(73) Assignee: Capital One Financial Corporation, McLean, VA (US)

( * ) Notice: Subject to any disclaimer, the term of this patent is extended or adjusted under 35 U.S.C. 154(b) by 861 days.

(21) Appl. No.: 12/335,055

(22) Filed: Dec. 15, 2008

Related U.S. Application Data

(60) Provisional application No. 61/013,696, filed on Dec. 14, 2007.

(51) Int. Cl.
*G06Q 40/00* (2006.01)

(52) U.S. Cl. .................................... 705/38; 705/35

(58) Field of Classification Search .................. 705/38, 705/35
See application file for complete search history.

(56) References Cited

U.S. PATENT DOCUMENTS

| | | | |
|---|---|---|---|
| 5,864,830 A | 1/1999 | Armetta et al. | |
| 5,991,748 A | 11/1999 | Taskett | |
| 6,182,895 B1 | 2/2001 | Albrecht | |
| 6,805,287 B2 | 10/2004 | Bishop et al. | |
| 7,072,864 B2 | 7/2006 | Brake, Jr. et al. | |
| 7,130,828 B2 | 10/2006 | Phillips et al. | |
| 7,165,049 B2 | 1/2007 | Slater | |
| 7,204,412 B2 | 4/2007 | Foss, Jr. | |
| 2002/0194122 A1 | 12/2002 | Knox et al. | |
| 2003/0033246 A1 | 2/2003 | Slater | |
| 2003/0046222 A1* | 3/2003 | Bard et al. | 705/38 |
| 2005/0199712 A1 | 9/2005 | Rosenblatt | |
| 2005/0228749 A1 | 10/2005 | Lozano | |
| 2006/0251225 A1 | 11/2006 | Gomez-Ortigoza | |
| 2007/0168274 A1 | 7/2007 | Taylor | |
| 2007/0194107 A1 | 8/2007 | Aigbogun | |
| 2007/0210152 A1 | 9/2007 | Read | |

* cited by examiner

*Primary Examiner* — Ojo O Oyebisi
(74) *Attorney, Agent, or Firm* — Hunton & Williams LLP

(57) ABSTRACT

A system and method for providing credit to a customer based on preliminary use of an account indicating that the customer is a good credit risk by providing to a customer an offer for a preliminary account associated with an action, facilitating a loan transaction between the customer and another party, receiving value from another party to initially fund the customer's preliminary account, providing the preliminary account to the customer, monitoring the preliminary account for the at least one predetermined action, repaying the another party the value received to initially fund the customer's preliminary account, and providing a credit account to the customer based on performance of the action.

27 Claims, 3 Drawing Sheets

SYSTEM AND METHOD FOR PROVIDING CREDIT TO A CUSTOMER BASED ON THE CUSTOMER'S PRELIMINARY USE OF AN ACCOUNT FUNDED BY ANOTHER PARTY

CROSS-REFERENCE TO RELATED APPLICATIONS

This application claims the benefit of U.S. Provisional Patent Application No. 61/013,696, filed on Dec. 14, 2007, which is incorporated herein by reference in its entirety.

FIELD OF THE INVENTION

The invention relates to a method and system for providing credit to a customer based on the customer's preliminary use of an account.

BACKGROUND OF THE INVENTION

Customers who are declined for a credit card often have limited options available to obtain credit. An individual may for various reasons have a poor credit score or credit history, but may at the same time actually be a good credit risk. For example, the individual's financial circumstances may have recently changed or the individual may have changed his or her spending habits. The individual may also have steadily improved his or her financial stability over time, but such activity may not be immediately reflected in the individual's credit score. A credit provider that assesses individual credit risk using only traditional measures, such as credit score and credit history, may likewise overlook such factors that would indicate that the customer is in fact a good credit risk. A substantial number of potential customers who are in fact creditworthy but are otherwise not able to obtain credit cards from a credit provider may therefore exist.

These and other drawbacks exist with current systems.

SUMMARY OF THE INVENTION

Various exemplary embodiments provide for providing credit to a customer based on the customer's preliminary use of an account. A card issuer may offer a preliminary account to a customer and the customer may demonstrate that he or she is in fact a good credit risk through the performance of at least one predetermined action associated with the preliminary account. The customer may then be provided a credit account when the at least one predetermined action has been performed. In that way, the customer is able to obtain a credit account by demonstrating creditworthiness through his or her behavior with a preliminary account.

Various exemplary embodiments may provide a method for providing credit to a customer based on preliminary use of an account indicating that the customer is a good credit risk. A customer may, for example, be declined for a credit account and instead offered a preliminary account. The preliminary account may be associated with at least one action that, if performed, would indicate that the customer is a good credit risk. The preliminary account may be monitored to determine if the at least one action has occurred, and if so, the customer may be provided a credit account. The preliminary account may be any of various accounts. The at least one action may be any action that may be performed with respect to the preliminary account, such as, for example, loading a predetermined amount of money into a prepaid card account in predetermined time intervals. The at least one action and/or terms of the credit account may also be customized for the particular customer.

Various exemplary embodiments may also provide a system for providing credit to a customer based on preliminary use of an account indicating that the customer is a good credit risk, including an offer module for offering to a customer a preliminary account associated with at least one action that, if performed, would indicate that the customer is a good credit risk. The system may also include a monitoring module for monitoring the preliminary account to determine if the at least one action has occurred. If so, a credit account module may provide a credit account to the customer.

Other embodiments are also within the scope of the invention.

BRIEF DESCRIPTION OF THE DRAWINGS

The present invention, together with further objects and advantages, may best be understood by reference to the following description taken in conjunction with the accompanying drawings, in the several Figures of which like reference numerals identify like elements, and in which.

DETAILED DESCRIPTION OF EXEMPLARY EMBODIMENT(S)

The following description is intended to convey a thorough understanding of the embodiments described by providing a number of specific embodiments and details involving systems and methods for providing credit to a customer based on the customer's preliminary use of an account. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Various exemplary embodiments provide for providing credit to a customer based on the customer's preliminary use of an account indicating that the customer is a good credit risk. As used herein, a good credit risk may indicate, for example, that a card issuer may be relatively unlikely to suffer loss due to a customer's non-payment of a loan or line of credit.

Figure 1:
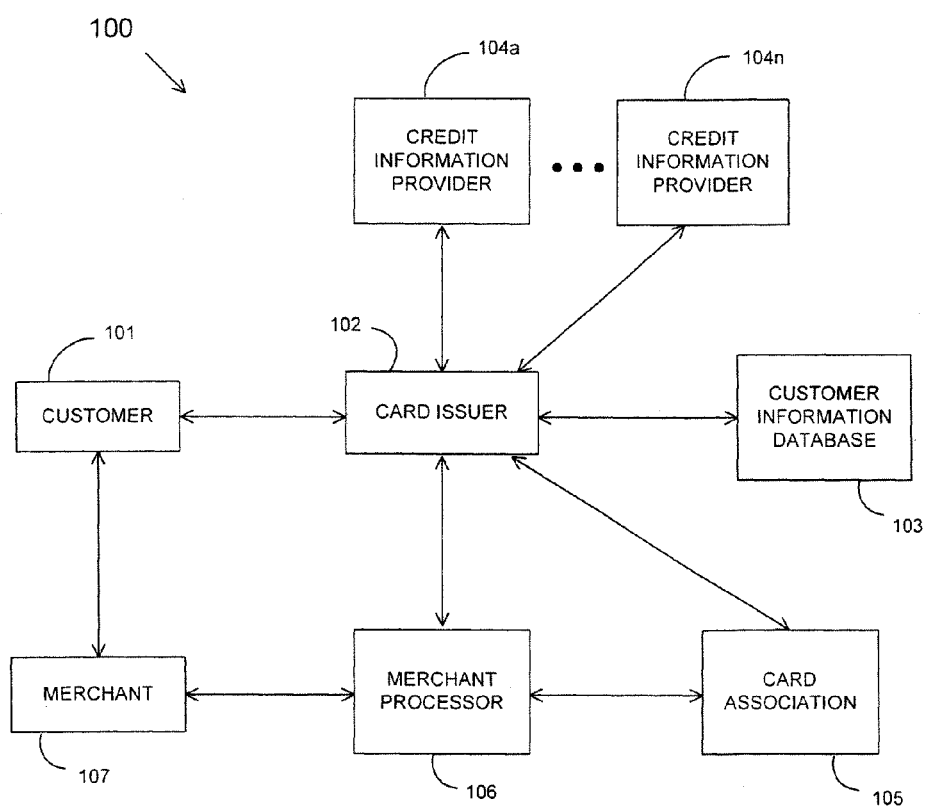
FIG. 1 depicts an exemplary embodiment of an exemplary system for providing credit to a customer based on the customer's preliminary use of an account according to various embodiments of the disclosure.

FIG. 1 depicts an exemplary embodiment of an exemplary system 100 for providing credit to a customer based on the customer's preliminary use of an account according to various embodiments of the disclosure. Exemplary system 100 may involve a customer 101, a card issuer 102, a customer information database 103, one or more credit information providers 104a-104n, a card association 105, a merchant processor 106, and a merchant 107.

Exemplary system 100 may include one or more network-enabled computers to process instructions for providing credit to a customer based on the customer's preliminary use of an account according to various embodiments of the disclosure. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of exemplary system 100 may execute one or more software applications to, for example, receive data as input from an entity accessing the network-enabled computer, process received data, transmit data over a network, and receive data over a network. The one or more network-enabled computers may also include one or more software applications to enable the processing of various transactions or communications.

The components depicted in FIG. 1 may also be coupled via one or more networks. As referred to herein, a network may include, but is not limited to: e.g., a wide area network (WAN), a local area network (LAN), a global network such as the Internet, a telephone network such as a public switch telephone network, a wireless communication network, a cellular network, an intranet, or the like, or any combination thereof. In exemplary embodiments, the network may include one, or any number of the exemplary types of networks mentioned above, operating as a stand alone network or in cooperation with each other. Use of the term network herein is not intended to limit the network to a single network. The components depicted in FIG. 1 may communicate by electronic transmission through the one or more networks mentioned above, by physical delivery, or by any other communication mechanism. Communication between two components depicted in FIG. 1 may also include communication with any other entities between the two components.

In various exemplary embodiments, the customer 101 may be any individual or entity that desires to obtain an account from the card issuer 102. The card issuer 102 may provide accounts to customers and may be, for example, a bank, another type of financial institution, or any other entity. As used herein, the term account may include any place, location, object, entity, or other mechanism for holding money or performing monetary transactions in any form, including, without limitation, electronic form. It will be recognized by those skilled in the art that various types of financial cards may be associated with accounts, such as, for example, pre-paid cards, debit cards, and credit cards.

As described herein, the customer 101 may communicate with the card issuer 102 or any other entity in the exemplary system 100, for example, by telephone, by mail, by electronic transmission at a retail location, or by electronic transmission from a computer. The customer 101 may also execute a web browser program on a computer to connect to a server of the card issuer 102 (e.g., via the Internet) and request the Uniform Resource Locator (URL) of a web page from the server. The server may receive the customer's request, process the request, retrieve or create the requested web page, and transmit the requested web page to the computer of the customer 101. The customer's web browser program may then receive the web page and render it on the customer's computer screen. The customer may interact with the web page by, for example, clicking on buttons or activating links associated with the web page or entering information with a keyboard. The web browser may interpret this interaction and send instructions to the server to perform a desired transaction or communication. Examples of commercial web browser programs suitable for this purpose are Internet Explorer available from Microsoft® Corporation, Netscape Navigator available from Netscape® Communications, Safari® available from Apple®, Inc., and Firefox® available from Mozilla Corporation.

The customer 101 may begin by requesting or applying for a credit account from the card issuer 102. The request submitted by the customer 101 may comprise, for example, identifying information about the customer 101 and information about his or her finances, other accounts, and major possessions that may indicate his or her net worth and financial status.

The card issuer 102 may then receive the information from the customer 101 and proceed to determine whether the customer 101 is eligible for a credit account. The card issuer 102 may, for example, submit requests to the one or more credit information providers 104a-104n for information about the customer's credit history, credit score, or financial habits. It will be recognized by those of ordinary skill in the art that the one or more credit information providers 104a-104n may be "credit bureaus" that provide credit information about individuals and entities to allow a card issuer to assess credit worthiness. These credit bureaus may collect financial data on a substantial amount of individuals and entities from data providers with which the bureaus have a relationship. The credit bureaus may then assemble that information into a credit report or credit score. The credit score may be based on various factors, such as an individual's payment history for debts, amount of debt, length of credit history, and types of credit used. Exemplary credit bureaus may include, without limitation, Experian, Equifax, TransUnion, Innovis, PRBC, Dun & Bradstreet, Experian Business, and Equifax Small Business Financial Exchange (SBFE). Exemplary types of credit scores may include, without limitation, a FICO score, NextGen Score, and VantageScore.

The card issuer 102 may also search a customer information database 103 for information about the particular customer 101 applying for a credit account. The customer information database 103 may store information about current, former, or potential customers of the card issuer 102 and may be internal or external to the card issuer 102. Searching the customer information database 103 may uncover, for example, that the customer 101 previously applied for and was declined a credit account, that the customer 101 previously committed fraud using a checking account with the card issuer 102, or that customer 101 engaged in activities that negatively affect a traditional "credit score" (e.g., missed numerous payments or defaulted on a loan).

Based on information about the customer 101 from the one or more credit information providers 104a-104n, customer information database 103, and any other sources, the card issuer 102 may determine whether the customer 101 is a good credit risk or a poor credit risk. As opposed to a good credit risk, a poor credit risk may indicate that the card issuer 102 may be relatively likely to suffer loss due to the customer's eventual non-payment of a line of credit given to him or her in the future. If the customer 101 is determined to be a good credit risk, the card issuer 102 may offer the customer 101 the credit account that he or she requested, or, if the customer 101 is a less than ideal credit risk, offer a credit account with more restrictive terms, such as a higher interest rate, higher annual fee, or lower credit limit.

If, however, the risk associated with offering the customer 101 a credit account is determined to be too high and the customer 101 is declined, the card issuer 102 may as an alternative offer the customer 101 another account that the customer 101 may use to demonstrate his or her credit worthiness over time. In various exemplary embodiments, the card issuer 102 may offer the customer 101 an alternative account and set various low risk behavior criteria or "benchmarks" that the customer 101 may meet to show that he or she is in fact a good credit risk. If the customer 101 meets those criteria, he or she may be "guaranteed" to receive a particular credit account from the card issuer 102. The "guarantee" given to the customer 101 may be subject to other conditions set by the card issuer 102.

The alternative account offered to the customer 101 may be any type of account, including, without limitation, a prepaid card account, stored value card account, debit card account, check card account, payroll card account, gift card account, prepaid credit card account, charge card account, checking account, rewards account, line of credit account, or credit account. In various exemplary embodiments, the card issuer 102 may offer an account that has no (or at least minimal) associated credit risk, such as a prepaid card account or stored value account, for example. With these accounts, a user may store or "load" money into the account and purchase goods and services using a card associated with the account as payment. There may be no credit risk associated with these accounts because the user is limited in the amount he or she can spend, i.e. he or she may only make purchases in amounts up to the value currently stored in the account.

For example, if a prepaid card is only "loaded" with $100, the user may only spend $100 with the card. A user may "load" (i.e., add money to) a prepaid card account or stored value card account in various ways, such as by depositing cash or a money order at a bank, automated teller machine (ATM), or affiliated prepaid card processor, by purchasing a card at a retail location with a set amount preloaded, by depositing money into the account through an electronic transfer initiated with a web browser, or by making a bank wire transfer. With some accounts, the user may also withdraw cash loaded into a prepaid card account or stored value account at an ATM. As will be understood by those of ordinary skill in the art, the user may also be given a personal identification number (PIN) to use along with his or her associated card.

The card issuer 102 may also offer other types of alternative accounts with greater levels of risk that the customer 101 may default. For example, a checking account may allow a user to "overdraft" (i.e., exceed the amount stored in the account) in various circumstances, usually by paying a fee. Credit accounts may operate similarly by allowing the user to make purchases on credit up to a specified dollar limit and repay the issuer for those purchases over time with monthly payments. The issuer may pay for the purchases of the user at the time of purchase and charge the user interest for using its credit services. Also, a charge card account may be offered wherein the balance of the user's card may be paid off monthly. Also, a debit card account may be offered wherein amounts for the user's purchases may be electronically debited from a checking or other account held by the user.

Also, any account offered to the customer 101 may be subject to various fees collected by the card issuer 102 or any other entity, such as, for example, a load fee, cash withdrawal fee, balance inquiry fee, replacement card fee, overdraft fee, or annual or monthly membership fee.

The customer 101 may accept the offer for the alternative account and then demonstrate his or her creditworthiness over time by meeting the criteria set by the card issuer 102. Meeting the criteria may indicate, for example, that the customer 101 is using the account in a positive manner and would be a good credit risk if he or she were given a credit account in the future. Examples of such criteria include, without limitation: (1) loading $100 into a prepaid card account every month for three consecutive months, (2) loading $500 into a prepaid card account every month for three consecutive months, (3) receiving a direct deposit into a prepaid card account every month for three consecutive months, (4) receiving a direct deposit from the customer's employer into a payroll card account every month for six consecutive months, (5) making automatic bill payments from a prepaid card account every month for eight consecutive months, (6) maintaining a checking account in good standing with no overdrafts for twelve consecutive months, (7) maintaining a balance of $1000 in a checking account for one year, (8) paying the full balance of a credit account that has a high interest rate with a prepaid card account every month for one year, (9) loading an amount into a prepaid card account and entering into a security arrangement regarding that amount, and (10) entering into a security arrangement regarding any amount held in an account. It will be recognized that the criteria set by the card issuer 102 may involve any type of account(s) and may include any action(s) that may be performed with respect to the offered account (whether performed by the customer 101 or any other entity), any time interval for performing the action(s), and any monetary amount associated with the action(s). The criteria may also involve any combination of accounts or actions, such as, for example, maintaining a set balance in a checking account and also loading a set amount into a prepaid card account. The criteria may also change over time as the customer 101 begins to demonstrate his or her creditworthiness, or lack thereof. For example, the amount that must be loaded each month may decrease if the customer 101 has met a particular criterion for a few months. Or, if the customer 101 is required to load $100 for three consecutive months, but only does so for two months, he or she may be given a "second chance" and provided the credit account if he or she then loads $200 for three additional consecutive months.

In various exemplary embodiments, the card issuer 102 may set criteria wherein the customer 101 may meet the criteria with respect to a particular account immediately to receive a credit account right away. For example, the customer 101 may accept an offer for a prepaid card account, load a specified amount (e.g., $500) into the account, and enter into a security arrangement with the card issuer 102 or any other entity. The card issuer 102 or other entity may thereby take a security interest in the amount initially loaded into the account (or any other funds held by the customer 101), while the customer 101 may be free to otherwise use the prepaid card account by loading additional funds and/or making purchases using a prepaid card associated with the account. In that way, the credit account provided to the customer 101 may be "secured" by the funds loaded into the customer's prepaid card account and the card issuer 102 may be protected from excess risk by virtue of the security interest in that amount. The customer 101 may also be able to accelerate the process of receiving a credit account.

It will be recognized by those of ordinary skill in the art that the customer 101 may enter into a security arrangement with the card issuer 102 (or any other entity) in various ways, such as by signing a written document in person at the location of the card issuer 102, signing and mailing a written document, or providing an electronic signature via a web site, as described herein. It will also be recognized that the security arrangement between the card issuer 102 and customer 101 may have any terms. For example, the card issuer's security interest may expire after a certain period of time, or the customer 101 may be able to reduce the card issuer's security interest by paying a fee.

In various exemplary embodiments, the card issuer 102 may set different criteria and different terms for the eventual credit account depending on the level of credit risk associated with the particular customer 101. In that way, the card issuer 102 may thereby customize an account and the eventual credit account for the customer 101. For example, if the customer 101 has a very poor credit score indicating that the customer 101 is a poor credit risk (e.g., because the customer 101 previously defaulted on a major loan), the card issuer 102 may offer criteria that are more difficult to meet and an eventual credit account with less economically advantageous terms (e.g., the customer 101 may receive a credit account with a 20% interest rate and $1000 credit limit if he or she loads $500 into a prepaid card account every month for one year). If, however, the customer 101 has a better credit score (but still below the threshold for offering a credit account right away), the card issuer 102 may offer criteria that are easier to meet and an eventual credit account with more economically advantageous terms (e.g., the customer 101 may receive a credit account with a 10% interest rate and $5000 credit limit if he or she loads $100 into a prepaid card account every month for three consecutive months). Also, the card issuer 102 may divide potential customers into groups according to their respective credit risks and offer each group a particular account and associated eventual credit account. The card issuer 102 may also offer multiple accounts and multiple associated eventual credit accounts to a particular customer 101 and allow the customer 101 to choose which one he or she prefers. The card issuer 102 may also, for example, allow the customer 101 a choice of whether to attempt to meet particular criteria and receive an "accelerated" credit account right away (e.g., by loading an amount into a prepaid card account and entering into a security arrangement with the card issuer 102) or to attempt to meet certain criteria over time (e.g., by loading an amount into a prepaid card account for a certain number of consecutive months).

In various exemplary embodiments, when the card issuer 102 offers the alternative account to the customer 101, the card issuer 102 may also notify the customer 101 what criteria or "benchmarks" he or she must meet to demonstrate his or her creditworthiness and receive a credit account. Notification may be accomplished in any way, including, for example, a written document, notification on a web page, electronic message, telephone message, e-mail, text message, instant message, or any other notification mechanism. In that way, the customer 101 may have an incentive to use the offered account wisely by meeting the criteria set by the card issuer 102 so that he or she can obtain a credit account in the future.

Also, rather than offering the customer 101 an alternative account when he or she is declined for a credit account, the card issuer 102 may instead independently offer an account to the customer 101 with an associated eventual credit account. For example, the customer 101 may purchase a prepaid card package at a retail location, the customer 101 may apply for an account in person at the location of the card issuer 102, or the card issuer 102 may mail a written offer for an account to the customer 101.

As described herein, once the customer 101 accepts the offer for the account (with the associated eventual credit account), the customer 101 may use a card associated with the account, such as a prepaid card, in any of the ways described herein. For example, the customer 101 may load money into a prepaid card account and purchase goods and services up to the loaded amount from a merchant 107, or up to the amount in excess of the secured amount if the customer 101 entered into a security arrangement, as described herein. In various exemplary embodiments, the card issuer 102 may also concurrently monitor the account to determine if and when any of the criteria are met. For example, the card issuer 102 may use one or more network-enabled computers executing software applications to monitor incoming deposits, loaded amounts, outgoing payments, and any other financial transactions with respect to the customer's account. The card issuer 102 may also monitor the customer's account to determine if the customer 101 entered into a security arrangement with respect to the account. The monitoring may be performed continuously (e.g., a continuously running software application) or at periodic time intervals (e.g., at the end of each day). The card issuer 102 may also electronically store information associated with the financial transactions and/or the criteria for certain accounts for future use. It is well-known in the art that electronic files may be stored in various ways, including, without limitation, a batch file, flat file, indexed file, hierarchical database, relational database, Microsoft® Excel file, Microsoft® Access file, or any other storage mechanism.

In various exemplary embodiments, the card issuer 102 may monitor the account and modify the terms of the account, the eventual credit account, or any other account based on the customer's behavior. For example, if the customer 101 partially meets a particular criterion (e.g., loads $500 into a prepaid card account for two months when the requirement to obtain a credit account is loading $500 for three months) or performs any other action indicating that the customer 101 is improving his or her financial status, the card issuer may load an extra $10 (or any other amount) into the customer's account. In that way, the customer 101 may be given an incentive to continue using his or her account wisely and eventually obtain a credit account. The terms of the account, the eventual credit account, or any other account may also be modified adversely if the customer's behavior with respect to the account is considered poor for any reason (e.g., the customer 101 misses a bill payment). The customer 101 may be notified of the terms of the monitoring to be performed by the card issuer 102 at the time of the original offer or at any other time, as described herein.

When the card issuer 102 determines that the criteria associated with the account provided to the customer 101 are completely met, the card issuer 102 may perform further processing to ensure that the customer 101 is in fact creditworthy before providing the "guaranteed" credit account to the customer 101. For example, the card issuer 102 may make a supplemental inquiry to the credit information providers 104a-104 or the customer information database 103 to determine whether any recent financial activity indicates that the customer 101 is a worse credit risk than originally thought. The supplemental inquiry may reveal that the customer 101 has an unresolved debt with the card issuer 102 that makes him or her ineligible for a credit account. The supplemental inquiry may also be disclosed to the customer 101 at the time of the original offer, as described herein. Such processing may also, for example, be limited in accordance with law.

If the customer 101 passes any additional checks imposed by the card issuer 102, the card issuer 102 may provide the credit account to the customer 101 according to the terms previously communicated to the customer 101 in the notification. The card issuer 102 may instead provide the customer 101 with a credit account offer with guaranteed approval. In these ways, the customer 101, who would normally be unable to obtain a credit account, may be able to do so by demonstrating his or her creditworthiness through using another account wisely. The card issuer 102 may also reward the customer 101 when the credit account is provided by, for example, loading $10 (or any other amount) into the customer's prepaid card account or transferring the funds in his or her prepaid card account to a higher yield account (e.g., a money market account). Also, if the customer 101 met some, but not all, of the criteria set by the card issuer 102, or if the additional checks revealed unfavorable information regarding the customer 101, the card issuer 102 may provide a credit account slightly different from the one for which the customer 101 originally applied, such as a credit account with a higher interest rate, higher annual fee, or lower credit limit. Also, the customer 101 may keep and continue to use the original account that he or she received prior to the credit account.

In various exemplary embodiments, the card issuer 102 may continue monitoring the customer's use of the original account as described herein to, for example, verify that the customer 101 is in fact a good credit risk or reward the customer 101 for good behavior. The card issuer 102 may monitor for performance of the original criteria that the customer 101 met to obtain the credit account, or may monitor for additional criteria with respect to any account held by the customer 101, including the credit account. If those criteria are met, the card issuer 102 may give a benefit to the customer 101 with respect to the credit account or any other account. For example, the customer 101 may use a prepaid card account wisely to reduce or increase the interest rate on another account (e.g., if the customer 101 makes three consecutive bill payments from his or her prepaid card account during the first year of having the credit account, the card issuer 102 may reduce the interest rate on the credit account or a student loan account held by the customer by 0.5%). In that way, the customer 101 may continue to be rewarded for good behavior with respect to his or her original account demonstrating that he or she is creditworthy. Also, if the customer 101 entered into a security arrangement upon loading an initial amount into an account, as described herein, the card issuer 102 may, for example, eliminate the security interest based on certain behavior or after a period of time (e.g., the same amount of time it would have taken the customer 101 to meet the criteria without entering into a security arrangement) or provide interest on amounts in a prepaid card account. When the security interest is released, the card issuer 102 may also reward the customer 101 by transferring the funds in his or her account to a higher yield account (e.g., a money market account) or opening a traditional deposit account. In that way, the customer 101 may "graduate" to traditional bank deposit accounts and the card issuer 102 may build a deeper relationship with the customer 101. Also, if the monitoring reveals that the customer 101 is in fact not a good credit risk, the card issuer 102 may modify the terms of the credit account or any other account to impose additional requirements on the customer 101 (e.g., if the customer 101 fails to continue depositing $100 each month into his or her prepaid card account, the card issuer may decrease the credit limit on the credit account or raise the interest rate on a student loan account held by the customer). Such modification may also, for example, be limited in accordance with law.

The customer 101 may be notified of the terms of the monitoring to be performed by the card issuer 102 after providing the credit account (e.g., what changes may be made to the customer's accounts based on his or her continuing behavior) at the time of the original offer, at the time when the credit account is provided, or at any other time. Also, the monitoring performed by the card issuer 102 after providing the credit account to the customer 101 may be done continuously or at periodic time intervals.

In various exemplary embodiments, the customer may have another party, such as a family member, company, person of interest, or the like, fund the customer account with the card issuer. For example, the other party may provide a peer-to-peer loan in a structured environment that provides the initial value or funds necessary for the customer to establish or obtain their account with the card issuer. The customer and the other party may communicate with the card issuer. The customer and the other party may also physically present themselves to the card issuer. The card issuer may facilitate and/or structure an agreement or loan between the customer and the other party. The agreement may provide terms by which the other party will fund the account through the card issuer on the customers behalf. The agreement may also include information about the loan or agreement or the account, such as the services provided by the card issuer, the fees charged, and benchmarks and/or criteria for the customer to achieve the road to credit. The other party may provide the funds or value to the card issuer to fund the customer's account. For example, the funds provided by the other party may initially fund a pre-paid card/secured-card for the customer. An account and/or card associated with the account, like a pre-paid or secured or the like, may be extended to the customer. The card issuer may service the account as any normal account. The card issuer may present the customer with a bill and facilitate payment to the other party. If the criteria or benchmarks are met (i.e. on-time payments to the other party/lender for 6 months), the card issuer may repay the other party the original amount lent to the customer. Additionally, the card issuer may provide the customer with an offer for another account with the card issuer, such as a credit account.

The interface for the customer and the other party to set up the arrangement or agreement may online. The service platform that manages/services accounts may be online. A system may be used to bill and collect payment from the lender and credit pay borrower.

In various exemplary embodiments, the customer 101 may purchase goods or services from the merchant 107 using a card associated with any of the accounts described herein. The merchant 107 may be any entity capable of accepting a card held by the customer 101 as payment for a transaction. The customer 101 may, for example, provide the merchant 107 with an account identifier associated with his or her account to purchase desired goods or services or conduct another type of financial transaction. Also, the customer 101 may swipe his or her card in person at the location of the merchant 107 using a register, card payment terminal, point of sale (POS) system, or ATM, which may read the account identifier from the magnetic stripe on the card. Also, the account identifier may be provided via a bar code on the card. Also, the account identifier may be provided via radio-frequency identification (RFID) or other automatic identification mechanisms. Various mechanisms for accepting an account identifier as payment will be recognized by those skilled in the art, including, for example, transaction processing equipment and software provided by VeriFone, Inc. of San Jose, Calif. Also, the customer 101 may provide the merchant 107 with the account identifier over the telephone or using a computer. For example, the customer 101 may make a purchase electronically by entering his or her customer identifier and/or other information associated with the desired purchase on the World Wide Web (WWW) site of the merchant 107, a site accessible via a network, or any other site accessible by a communication mechanism. Various mechanisms for conducting online transactions will be recognized by those skilled in the art. The customer 101 may also make a purchase electronically using various payment services, such as, for example, PayPal®. The merchant 107 may communicate with other entities, including, for example, the merchant processor 106, card association 105, and card issuer 102 to process payment for the customer's purchase.

When the customer 101 uses a credit card associated with a credit account, as described herein, operation may differ. It will be recognized by those skilled in the art that in at least some exemplary credit card transactions, there may be at least two phases to completing a transaction: authorization and settlement. In the authorization phase, the merchant 107 may perform various actions to find out whether the customer's desired transaction is valid (e.g., if the customer 101 has enough credit to make a particular purchase). If the transaction is valid, the merchant 107 may receive payment for the transaction in the settlement phase (e.g., from the card issuer 102). The card association 105 may administer credit cards and act as a gateway between the merchant 107 and the card issuer 102 for processing a card transaction initiated by the customer 101. Exemplary card associations may include, without limitation, Visa® and MasterCard®. Also, the merchant processor 106 may have a predefined relationship, agreement, or arrangement with the merchant 107 to authorize and settle card transactions on behalf of the merchant 107. The merchant processor 106 may process transactions for a plurality of merchants and a plurality of customers. TSYS Acquiring Solutions, LLC (TSYS), which those skilled in the art will recognize as an entity that authorizes and settles card transactions, may operate as the merchant processor 106.

Figure 2:
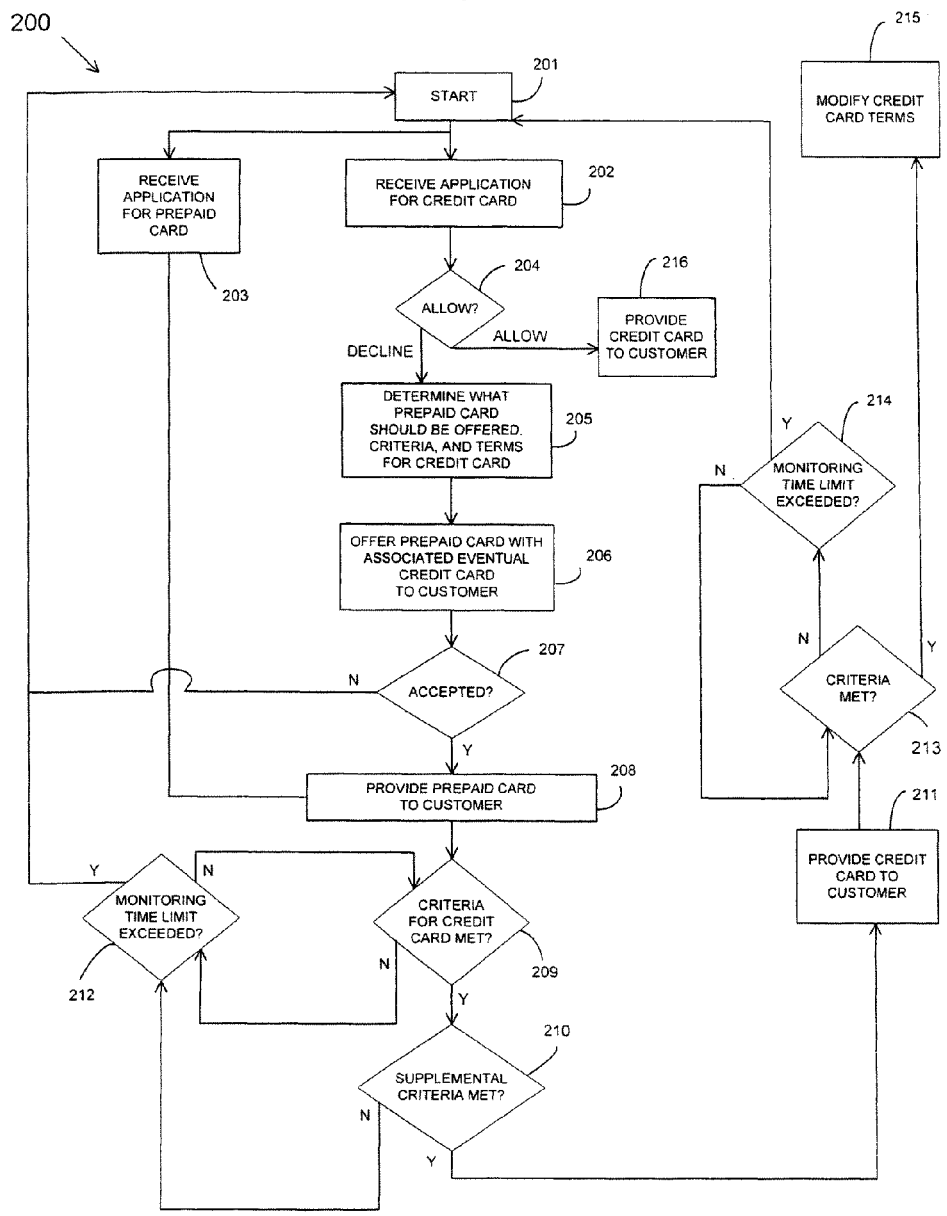
FIG. 2 depicts an exemplary flow chart which illustrates an exemplary method for providing credit to a customer based on the customer's preliminary use of an account according to various embodiments of the disclosure.

FIG. 2 depicts an exemplary flow chart 200 which illustrates an exemplary method for providing credit to a customer based on the customer's preliminary use of an account according to various embodiments of the disclosure. FIG. 2 is described with reference to a prepaid card account offered to a customer with an eventual credit card. However, it will be understood that, as described herein, any type of account may be used in each instance.

The method may start at block 201. At block 202, a card issuer may receive an application from a customer for a credit card. The application may be received in various ways, such as by mail or by a web browser request, and may contain information about the customer and his or her finances. The application may be for a specific credit card with certain features, such as a particular interest rate, annual fee, credit limit, and background imprinted on the credit card. At block 204, the card issuer may make a decision whether to provide the desired credit card to the customer, using, for example, credit information obtained from a credit bureau or any other resource. If the card issuer decides to allow the credit card application, the card issuer may provide the credit card to the customer at block 216. If the card issuer declines the customer's application for any reason, the card issuer may next determine at block 205 what prepaid card should be offered to the customer, what criteria should be set for the prepaid card to receive a "guaranteed" credit card (e.g., loading $100 into the prepaid card account every month for three consecutive months), and what terms should be set for the eventual credit card (e.g., interest rate, annual fee, credit limit). The determination may be made based on information about the customer and his or her finances obtained from any source, including, for example, a credit bureau or database.

At block 206, the card issuer may offer a prepaid card (with the associated "guarantee" for an eventual credit card) to the customer. At block 207, the card issuer may determine whether the customer accepted the offer. If so, the card issuer may proceed to provide the prepaid card to the customer at block 208. If not, the card issuer may return to block 201 and await a new application. Also, rather than receiving and declining a credit card application from a customer, the card issuer may instead receive an application for a prepaid card (with the associated "guarantee" for an eventual credit card) at block 203 and then provide the prepaid card to the customer at block 208.

At block 209, the card issuer may monitor the prepaid account to determine whether the criteria for the customer to obtain the credit card are met (e.g., whether the customer loaded $100 into a prepaid card account every month for three consecutive months, whether the customer entered into a security arrangement with the card issuer with respect to a particular amount loaded into a prepaid card account). If not, the card issuer may proceed to determine at block 212 whether it should continue waiting for the criteria to be met. If, for example, the card issuer set a time limit of two years for the criteria to be met and the two year period has expired, the card issuer may return to block 201 and await a new application (and may allow the customer to keep using the prepaid card, but without the possibility of obtaining a credit card). If, however, it is determined at block 212 that there is time remaining for the criteria to be met, the card issuer may check again at block 209. The monitoring process to determine whether the customer is creditworthy may take any length of time, from days to weeks to years, and may be continuous or in periodic time intervals. Once the card issuer determines that the customer has met the required criteria, the card issuer may at block 210 determine if any supplemental criteria, such as a credit score above a certain level, are met as well, as described herein. If not, the card issuer may again determine at block 212 whether it should continue waiting for the criteria to be met. If it should not continue, the card issuer may return to block 201, but if it should, the card issuer may again determine whether the criteria and/or supplemental criteria are met at block 209 and block 210. If the supplemental criteria are satisfied, the card issuer may proceed to provide the credit card to the customer at block 211.

As described herein, the card issuer may continue to monitor the prepaid account at block 213 to determine whether the terms of the credit may be modified after it has been provided to the customer. If any necessary criteria are met, the card issuer may at block 216 modify the credit card terms for the customer (e.g., reduce interest rate, eliminate annual fee, decrease credit limit). If not, the card issuer may determine at block 214 whether it should continue waiting for the criteria to be met. If there is time remaining, for example, the card issuer may again determine if the criteria are met at block 213. If not, the card issuer may return to block 201.

Figure 3:
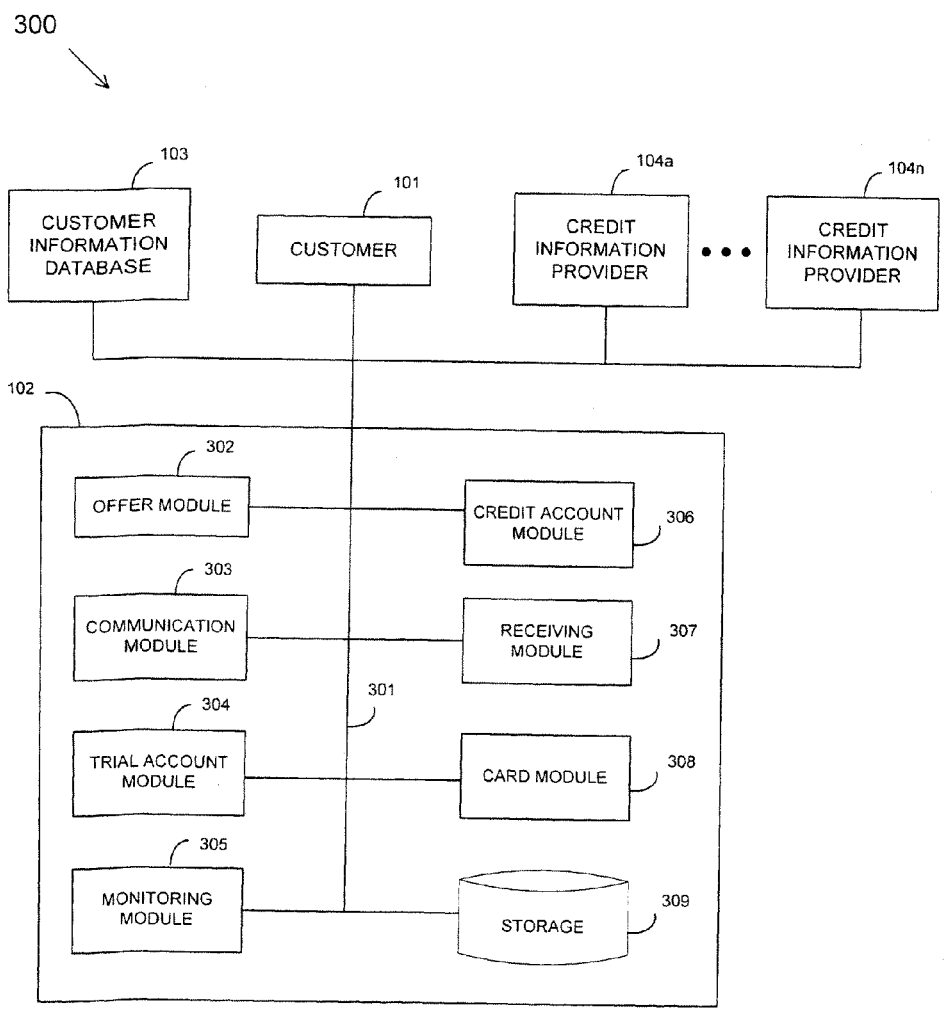
FIG. 3 depicts an exemplary system for providing credit to a customer based on the customer's preliminary use of an account according to various embodiments of the disclosure.

FIG. 3 depicts an exemplary system 300 for providing credit to a customer based on the customer's preliminary use of an account according to various embodiments of the disclosure. The card issuer 102 may include one or more modules: an offer module 302, a communication module 303, a preliminary account module 304, a monitoring module 305, a credit account module 306, a receiving module 307, and a card module 308. One or more of the modules may electronically communicate with each other and/or other entities or systems, such as, for example, the customer 101, the customer information database 103, or the credit information providers 104a-104n, via a communication mechanism 301, such as a data communication bus or one or more networks as defined herein. The modules may each be an appropriately programmed computer, such as a mainframe or personal computer, or may include a plurality of such computers cooperating to perform the functionality described herein. The modules may also communicate with a storage mechanism 309, as described herein.

The offer module 302 may provide to the customer 101 an offer for an account, such as a prepaid card account, along with an associated "guarantee" for an eventual credit card, as described herein. The offer may be in response to a declined application (based on information received from the one or more credit information providers 104a-104n or the customer information database 103, for example) or other event indicating that the customer 101 may desire a particular account. In that case, information associated with the event may be received by the receiving module 307. Also, the offer may be initiated by the card issuer 102 independently of any event or action.

The account offered to the customer 101 may be associated with criteria that may be met to show that the customer 101 is in fact a good credit risk and receive a credit card, as described herein. The customer 101 may be informed of such criteria, as well as the terms of the eventual credit card, at the time of the offer. In an embodiment, the offer module 302 may facilitate and/or structure an agreement or loan between the customer and another party. The communication module 303 may then communicate with the customer 101, for example, via the communication mechanism 301. The communications module 303 may also receive the customer's acceptance of the offer for the account. The communications module 303 may also receive value from another party to fund the customer's preliminary account. The preliminary account module 304 may then provide the account to the customer 101. The card module 308 may also provide the customer 101 with a card associated with the account, which the customer 101 may then use to purchase goods and services, access the account online or at the location of the card issuer 102, or perform any other actions with respect to the account. As will be understood by those of ordinary skill in the art, the card may have an associated account number, which may be, for example, imprinted on the face of the card. The monitoring module 305 may then monitor the account to determine if and when the criteria set by the card issuer 102 are met. As described herein, the monitoring may occur continuously or periodically. The storage mechanism 309 may be used to store data during the time of the monitoring process as well.

Once the criteria (and any other supplemental criteria imposed by the card issuer 102) have been met and the customer 101 has thereby shown that he or she is creditworthy, the credit account module 306 may provide the credit account to the customer 101. The credit account may have the terms (e.g., interest rate, annual fee, credit limit) originally communicated to the customer 101 or may be modified based on the customer's financial activities or any other event. Additionally, once the criteria are met, the communications module 303 may repay the another party the value received to fund the customer's preliminary account. The card module 308 may also provide to the customer 101 a card associated with the credit account, which the customer 101 may use, for example, to purchase goods and services on credit. The card associated with the credit account may also have an associated credit account number, as will be recognized by those of ordinary skill in the art. Also, the original account and credit account may share the same number and/or the same card. In that case, the customer 101, the merchant 107 from which the customer 101 desires to make a purchase, or any other entity may specify whether the card should be used as a credit card or other type of card for any particular transaction.

The present invention gives customers who would normally not be able to obtain credit a mechanism to prove their creditworthiness over time and acquire a credit account. Card issuers often assess credit risk using traditional measures like credit score and credit history, rather than a customer's actual behavior with a particular account, which may be more accurate than traditional measures. Prepaid card account usage, for example, may provide key insights into customer income and risk. The present invention thereby allows card issuers to service an overlooked "unbanked" or "underbanked" segment of the population. Card issuers may also be able to build more sophisticated risk models over time by incorporating prepaid behavior, for example, and identifying the specific criteria or "benchmarks" that split credit risk the best.

The present invention also gives customers an incentive to use accounts wisely to obtain future credit, and encourages customer loyalty to a card issuer that offers an account with an associated "guaranteed" credit account. Because the customer is given a way to "graduate" to products beyond the initial account, he or she may be more likely to open new accounts with the card issuer, which may in turn increase the card issuer's business with the customer and potentially increase the interest that the card issuer receives on credit accounts. Also, by obtaining a credit account as described herein and using it wisely, the customer may rebuild his or her credit history, which may previously have been quite poor.

The embodiments of the present invention are not to be limited in scope by the specific embodiments described herein. For example, any type of account, not just a prepaid card account or credit account, may be offered to a customer. Or, the criteria or "benchmarks" may be anything that may occur or be performed with respect to an account. Or, monitoring the account for the criteria may occur at any time and in any manner. Or, a security arrangement between a customer and another entity with respect to an amount held in an account may have any features and/or terms. Or, the card issuer may be located remotely from the customer and accessible to the customer via, for example, the telephone or one or more networks. Or, the system for providing credit to a customer may be a collection of more than one computer, each operating collectively as the system. Or, the system may be automated such that providing credit to a customer does not require interaction with an operator or a user.

Thus, such modifications are intended to fall within the scope of the following appended claims. Further, although some of the embodiments of the present invention have been described herein in the context of a particular implementation in a particular environment for a particular purpose, those of ordinary skill in the art should recognize that its usefulness is not limited thereto and that the embodiments of the present invention can be beneficially implemented in any number of environments for any number of purposes. Accordingly, the claims set forth below should be construed in view of the full breadth and spirit of the embodiments of the present invention as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

The invention claimed is:

1. A computer-implemented method for providing credit to a customer based on use of an account indicating that the customer of a financial institution is a good credit risk comprising:

facilitating a loan transaction between a customer of the financial institution and another party;

receiving, at the financial institution, value from the another party to fund a preliminary account for the customer, wherein the preliminary account is associated with at least one predetermined action that may be performed with respect to the preliminary account, and the performance of the at least one predetermined action indicates that the customer is a good credit risk;

providing the preliminary account to the customer;
electronically monitoring, using a monitoring computer associated with the financial institution, the preliminary account for the at least one predetermined action; and
providing a credit account to the customer based on the performance of the at least one predetermined action, wherein the credit account is associated with predetermined credit account parameters.

2. The method of claim 1 further comprising:
repaying the another party the value received to fund the customer's preliminary account based on the performance of the at least one predetermined action.

3. The method of claim 1, wherein the loan transaction is facilitated over the internet.

4. The method of claim 1, wherein the preliminary account is a prepaid card account, stored value card account, debit card account, check card account, payroll card account, gift card account, prepaid credit card account, charge card account, checking account, rewards account, line of credit account, or credit account.

5. The method of claim 1, wherein the at least one predetermined action is customized for the customer or for a group of customers to which the customer is a member.

6. The method of claim 5, wherein the at least one predetermined action is based on the customer's financial history, credit history, or credit score.

7. The method of claim 1, wherein the at least one predetermined action is selected from the group consisting of:
loading predetermined amounts into the preliminary account in predetermined time intervals, wherein the preliminary account is a prepaid account,
loading predetermined amounts into the preliminary account in predetermined time intervals, wherein the preliminary account is a prepaid account and the customer has a credit score above a predetermined level,
depositing predetermined amounts into the preliminary account in predetermined time intervals,
receiving direct deposits into the preliminary account in predetermined time intervals,
receiving direct deposits from the customer's employer into the preliminary account in predetermined time intervals,
making automatic bill payments from the preliminary account in predetermined time intervals,
maintaining the preliminary account in good standing for a period of time, maintaining a predetermined balance in the preliminary account for a period of time,
loading a secured amount into the preliminary account and granting a security interest in the secured amount, and
granting a security interest in an amount in the preliminary account.

8. The method of claim 1, wherein the predetermined credit account parameters are customized for the customer.

9. The method of claim 1, further comprising:
providing to the customer a first card associated with the preliminary account and a credit card associated with the credit account, wherein the preliminary account is associated with a preliminary account number and the credit account is associated with a credit account number.

10. The method of claim 1, further comprising:
providing to the customer a card associated with the preliminary account and the credit account, wherein the preliminary account and the credit account are associated with an account number.

11. The method of claim 1, further comprising:
providing to the customer an offer for a preliminary account.

12. A system for providing credit to a customer based on use of an account indicating that the customer of a financial institution is a good credit risk comprising:
an offer module operable to facilitate a loan transaction between a customer of the financial institution and another party;
a communication module operable to receive value from the another party to fund a preliminary account for the customer, the preliminary account is associated with at least one predetermined action that may be performed with respect to the preliminary account, the performance of the at least one predetermined action indicates that the customer is a good credit risk;
a preliminary account module operable to provide the preliminary account to the customer;
a monitoring module operable to monitor the preliminary account for the at least one predetermined action;
a credit account module operable to provide a credit account to the customer based on the performance of the at least one predetermined action, wherein the credit account is associated with predetermined credit account parameters.

13. The system of claim 12, wherein the offer module is further operable to provide to a customer an offer for a preliminary account.

14. The system of claim 12, wherein the communications module is further operable to repay the another party the value received to fund the customer's preliminary account based on the performance of the at least one predetermined action.

15. The system of claim 12, wherein the loan transaction is facilitated over the internet.

16. The system of claim 12, wherein the preliminary account is a prepaid card account, stored value card account, debit card account, check card account, payroll card account, gift card account, prepaid credit card account, charge card account, checking account, rewards account, line of credit account, or credit account.

17. The system of claim 12, wherein the at least one predetermined action is customized for the customer or for a group of customers to which the customer is a member.

18. The system of claim 17, wherein the at least one predetermined action is based on the customer's financial history, credit history, or credit score.

19. The system of claim 12, wherein the at least one predetermined action is selected from the group consisting of:
loading predetermined amounts into the preliminary account in predetermined time intervals, wherein the preliminary account is a prepaid account,
loading predetermined amounts into the preliminary account in predetermined time intervals, wherein the preliminary account is a prepaid account and the customer has a credit score above a predetermined level,
depositing predetermined amounts into the preliminary account in predetermined time intervals,
receiving direct deposits into the preliminary account in predetermined time intervals,
receiving direct deposits from the customer's employer into the preliminary account in predetermined time intervals,
making automatic bill payments from the preliminary account in predetermined time intervals,
maintaining the preliminary account in good standing for a period of time,
maintaining a predetermined balance in the preliminary account for a period of time,
loading a secured amount into the preliminary account and granting a security interest in the secured amount, and granting a security interest in an amount in the preliminary account.

20. The system of claim 12, wherein the predetermined credit account parameters are customized for the customer.

21. The system of claim 12, further comprising:
providing to the customer a first card associated with the preliminary account and a credit card associated with the credit account, wherein the preliminary account is associated with a preliminary account number and the credit account is associated with a credit account number.

22. The system of claim 12, further comprising:
providing to the customer a card associated with the preliminary account and the credit account, wherein the preliminary account and the credit account are associated with an account number.

23. A computer-implemented method for providing credit to a customer of a financial institution based on preliminary use of an account indicating that the customer is a good credit risk, the preliminary account funded by another party using a structured loan, the method comprising:
providing to a customer an offer for a preliminary account, wherein:
the preliminary account is associated with at least one predetermined action that may be performed with respect to the preliminary account;
facilitating a loan transaction between a customer of the financial institution and another party;
receiving, at the financial institution, value from the another party to fund a preliminary account for the customer,
providing the preliminary account to the customer;
electronically monitoring, using a monitoring computer associated with the financial institution, the preliminary account for the at least one predetermined action; and
providing a credit account to the customer based on the performance of the at least one predetermined action, wherein the credit account is associated with predetermined credit account parameters.

24. The method of claim 23, further comprising:
repaying the another party the value received to fund the customer's preliminary account.

25. The method of claim 23, further comprising:
receiving information associated with a triggering event prior to providing to the customer the offer for the preliminary account.

26. The method of claim 25, wherein the triggering event is a declined application by the customer for the credit account or a customer request for the preliminary account.

27. The method of claim 23, wherein the offer for the preliminary account comprises a notification of the at least one predetermined action and predetermined credit account parameters.

* * * * *

UNITED STATES PATENT AND TRADEMARK OFFICE
CERTIFICATE OF CORRECTION

| | |
|---|---|
| PATENT NO. | : 8,335,739 B1 |
| APPLICATION NO. | : 12/335055 |
| DATED | : December 18, 2012 |
| INVENTOR(S) | : Bol et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 946 days.

Signed and Sealed this
Fifth Day of November, 2013

Teresa Stanek Rea
*Deputy Director of the United States Patent and Trademark Office*